(12) United States Patent
Lord

(10) Patent No.: US 11,129,418 B2
(45) Date of Patent: Sep. 28, 2021

(54) ELECTRONIC INHALATION DEVICE WITH SUSPENSION FUNCTION

(71) Applicant: Nicoventures Holdings Limited, London (GB)

(72) Inventor: Christopher Lord, London (GB)

(73) Assignee: Nicoventures Trading Limited, London (GB)

( * ) Notice: Subject to any disclaimer, the term of this patent is extended or adjusted under 35 U.S.C. 154(b) by 222 days.

(21) Appl. No.: 15/231,359

(22) Filed: Aug. 8, 2016

(65) Prior Publication Data

US 2017/0035114 A1   Feb. 9, 2017

Related U.S. Application Data

(62) Division of application No. 14/432,752, filed as application No. PCT/EP2013/071070 on Oct. 9, 2013, now Pat. No. 9,462,863.

(30) Foreign Application Priority Data

Oct. 19, 2012 (GB) ..................... 1218817

(51) Int. Cl.
| | |
|---|---|
| A24F 40/50 | (2020.01) |
| G05B 23/02 | (2006.01) |
| A24F 40/60 | (2020.01) |
| H05B 1/02 | (2006.01) |
| A24F 40/10 | (2020.01) |

(52) U.S. Cl.
CPC .............. *A24F 40/50* (2020.01); *A24F 40/60* (2020.01); *G05B 23/0267* (2013.01); *H05B 1/0244* (2013.01); *A24F 40/10* (2020.01); *H05B 2203/021* (2013.01)

(58) Field of Classification Search
CPC ........ A24F 47/008; A24F 40/50; A24F 40/60; A24F 40/10; H05B 1/0244; H05B 2203/021; G05B 23/0267; A61M 15/06
See application file for complete search history.

(56) References Cited

U.S. PATENT DOCUMENTS

| | | | |
|---|---|---|---|
| 947,999 | A | 2/1910 | Schweppe |
| 2,057,353 | A | 10/1936 | Whittemore, Jr. |
| 4,947,875 | A | 8/1990 | Brooks et al. |
| 5,095,921 | A | 3/1992 | Losee et al. |
| 5,261,424 | A | 11/1993 | Sprinkel |

(Continued)

FOREIGN PATENT DOCUMENTS

| | | |
|---|---|---|
| CA | 2641869 A1 | 5/2010 |
| CA | 2876267 A1 | 6/2015 |

(Continued)

OTHER PUBLICATIONS

IPRP for International Patent Application No. PCT/EP2013/071070 dated Nov. 21, 2014.

(Continued)

*Primary Examiner* — Michael D Masinick
(74) *Attorney, Agent, or Firm* — Patterson Thuente Pedersen, P.A.

(57) ABSTRACT

An electronic inhalation device comprising a power cell and a computer. The computer comprises a computer processor, a memory and an input-output means. The computer is configured in use to enter a menu mode when a user activates the menu mode.

22 Claims, 5 Drawing Sheets

(56) References Cited

U.S. PATENT DOCUMENTS

| | | |
|---|---|---|
| 5,372,148 A | 12/1994 | McCafferty et al. |
| 5,809,997 A | 9/1998 | Wolf |
| 5,894,841 A | 4/1999 | Voges |
| 5,949,632 A | 9/1999 | Barreras |
| 6,040,560 A | 3/2000 | Fleischhauer |
| 6,183,425 B1* | 2/2001 | Whalen .............. A61B 5/1038 600/592 |
| 6,196,218 B1 | 3/2001 | Voges |
| 6,873,322 B2 | 3/2005 | Hartular |
| 6,958,691 B1 | 10/2005 | Anderson et al. |
| 7,109,445 B2 | 9/2006 | Patterson |
| 7,726,320 B2 | 6/2010 | Robinson |
| 7,726,329 B2 | 6/2010 | Robinson |
| 8,159,204 B2 | 4/2012 | Grant |
| 8,550,069 B2 | 10/2013 | Alelov |
| 8,807,131 B1 | 8/2014 | Tunnell |
| 8,997,753 B2 | 4/2015 | Li |
| 9,095,175 B2 | 8/2015 | Terry et al. |
| 9,289,014 B2 | 3/2016 | Tucker |
| 9,451,791 B2 | 9/2016 | Sears |
| 9,462,832 B2 | 10/2016 | Lord |
| 9,497,999 B2 | 11/2016 | Lord |
| 9,597,466 B2 | 3/2017 | Henry |
| 10,117,460 B2* | 11/2018 | Sears .................... A24F 40/53 |
| 10,159,279 B2 | 12/2018 | Lord et al. |
| 2003/0033055 A1 | 2/2003 | McRae et al. |
| 2003/0123328 A1* | 7/2003 | Guanter ................ G04G 11/00 368/82 |
| 2003/1323329 | 7/2003 | Guanter |
| 2003/0179003 A1 | 9/2003 | Toda et al. |
| 2003/0226837 A1 | 12/2003 | Blake |
| 2005/0045193 A1 | 3/2005 | Yang |
| 2005/0058441 A1 | 3/2005 | Kameyama et al. |
| 2005/0081846 A1 | 4/2005 | Barney |
| 2005/0143866 A1 | 6/2005 | McRae |
| 2005/0161467 A1 | 7/2005 | Jones |
| 2005/0247305 A1 | 11/2005 | Zierenberg |
| 2005/0268911 A1 | 12/2005 | Cross et al. |
| 2006/0047368 A1 | 3/2006 | Maharajh |
| 2006/0130838 A1 | 6/2006 | Yong |
| 2006/0130860 A1 | 6/2006 | Cholet |
| 2007/0006889 A1 | 1/2007 | Kobal |
| 2007/0045288 A1 | 3/2007 | Nelson |
| 2008/0092912 A1 | 4/2008 | Robinson et al. |
| 2008/0257367 A1 | 10/2008 | Paterno |
| 2009/0230117 A1 | 9/2009 | Fernando et al. |
| 2009/0283103 A1* | 11/2009 | Nielsen .................... A24F 1/30 131/273 |
| 2009/0308387 A1 | 12/2009 | Andersen |
| 2010/0050770 A1 | 3/2010 | Barger |
| 2010/0059070 A1 | 3/2010 | Potter et al. |
| 2010/0206306 A1 | 8/2010 | Feriani |
| 2010/0242974 A1* | 9/2010 | Pan ...................... A24F 47/008 131/273 |
| 2011/0036346 A1* | 2/2011 | Cohen ................ A24F 47/008 128/200.14 |
| 2011/0113368 A1* | 5/2011 | Carvajal .............. G06F 3/03547 715/810 |
| 2011/0210746 A1 | 9/2011 | Yogou et al. |
| 2011/0226236 A1 | 9/2011 | Buchberger |
| 2011/0247620 A1 | 10/2011 | Armstrong |
| 2011/0253139 A1 | 10/2011 | Guthrie |
| 2011/0265806 A1 | 11/2011 | Alarcon |
| 2011/0304282 A1 | 12/2011 | Li et al. |
| 2012/0012106 A1 | 1/2012 | Bari |
| 2012/0048266 A1 | 3/2012 | Alelov |
| 2012/0060853 A1 | 3/2012 | Robinson et al. |
| 2012/0208601 A1 | 6/2012 | Lockwood |
| 2012/0186594 A1* | 7/2012 | Liu ...................... A24F 47/008 131/329 |
| 2012/0318882 A1 | 12/2012 | Abehasera |
| 2013/0008436 A1 | 1/2013 | Von Hollen |
| 2013/0042865 A1 | 2/2013 | Monsees |
| 2013/0104916 A1* | 5/2013 | Bellinger ............... A24F 47/008 131/328 |
| 2013/0192615 A1* | 8/2013 | Tucker ..................... H05B 3/12 131/328 |
| 2013/0192622 A1 | 8/2013 | Tucker et al. |
| 2013/0199528 A1* | 8/2013 | Goodman ............. A24F 47/008 128/203.26 |
| 2013/0228191 A1 | 9/2013 | Newton |
| 2013/0255702 A1 | 10/2013 | Griffith |
| 2013/0269685 A1 | 10/2013 | Wachtel |
| 2013/0284192 A1* | 10/2013 | Peleg ..................... A24F 47/004 131/329 |
| 2013/0319439 A1* | 12/2013 | Gorelick .................. A24F 13/02 131/329 |
| 2013/0340755 A1 | 12/2013 | Ruff |
| 2013/0340775 A1* | 12/2013 | Juster .................... A24F 47/008 131/273 |
| 2014/0000603 A1 | 1/2014 | Hosemann |
| 2014/0000638 A1 | 1/2014 | Sebastian |
| 2014/0008384 A1 | 1/2014 | Helmlinger |
| 2014/0014126 A1 | 1/2014 | Peleg |
| 2014/0060554 A1 | 3/2014 | Collett |
| 2014/0096781 A1 | 4/2014 | Sears |
| 2014/0123990 A1* | 5/2014 | Timmermans ........ A24F 47/008 131/328 |
| 2014/0209105 A1 | 7/2014 | Sears |
| 2014/0261414 A1 | 9/2014 | Weitzel |
| 2014/0261486 A1 | 9/2014 | Potter |
| 2014/0270727 A1 | 9/2014 | Ampolini |
| 2014/0345635 A1 | 11/2014 | Rabinowitz |
| 2014/0366894 A1 | 12/2014 | Liu |
| 2014/0366898 A1 | 12/2014 | Monsees |
| 2015/0047656 A1 | 2/2015 | Robinson et al. |
| 2015/0097513 A1 | 4/2015 | Liberi |
| 2015/0114408 A1 | 4/2015 | Lord |
| 2015/0128965 A1 | 5/2015 | Lord |
| 2015/0128966 A1 | 5/2015 | Lord |
| 2015/0136153 A1 | 5/2015 | Lord |
| 2015/0174348 A1 | 6/2015 | Tunnell |
| 2015/0237917 A1 | 8/2015 | Lord |
| 2015/0245660 A1 | 9/2015 | Lord |
| 2015/0257448 A1 | 9/2015 | Lord |
| 2015/0336689 A1 | 11/2015 | Brown et al. |
| 2016/0206000 A1 | 7/2016 | Lord et al. |
| 2016/0242466 A1 | 8/2016 | Lord et al. |
| 2018/0153223 A1 | 6/2018 | Lord |
| 2019/0133192 A1 | 5/2019 | Lord et al. |

FOREIGN PATENT DOCUMENTS

| | | | |
|---|---|---|---|
| CN | 1280661 A | 1/2001 | |
| CN | 1330563 A | 1/2002 | |
| CN | 201029436 Y | 3/2008 | |
| CN | 201238610 Y | 5/2009 | |
| CN | 101518361 A | 9/2009 | |
| CN | 101557728 | 10/2009 | |
| CN | 101557728 A | 10/2009 | |
| CN | 100566769 C | 12/2009 | |
| CN | 201379072 Y | 1/2010 | |
| CN | 201393548 Y | 2/2010 | |
| CN | 2468932 A * | 9/2010 | ........... A24F 47/008 |
| CN | 201821914 U | 5/2011 | |
| CN | 201830899 U | 5/2011 | |
| CN | 102247640 A | 11/2011 | |
| CN | 102264251 A | 11/2011 | |
| CN | 102934843 A | 2/2013 | |
| CN | 102970885 | 3/2013 | |
| CN | 202890466 U | 4/2013 | |
| CN | 203070141 U | 7/2013 | |
| CN | 103237468 A | 8/2013 | |
| CN | 103415222 A | 11/2013 | |
| CN | 104049550 | 9/2014 | |
| CN | 203841114 U | 9/2014 | |
| CN | 203986103 U | 12/2014 | |
| CN | 104540406 A | 4/2015 | |
| CN | 204335831 U | 5/2015 | |
| DE | 102009029768 | 1/2011 | |
| EA | 019736 B1 | 5/2014 | |

(56) References Cited

FOREIGN PATENT DOCUMENTS

| | | |
|---|---|---|
| EP | 1712178 A2 | 10/2006 |
| EP | 2143346 | 1/2010 |
| EP | 2404515 A1 | 1/2012 |
| EP | 2460423 A1 | 6/2012 |
| EP | 2727619 | 5/2014 |
| EP | 2908675 A1 | 8/2015 |
| EP | 3116334 A1 | 1/2017 |
| EP | 3154382 A1 | 4/2017 |
| EP | 3307097 A1 | 4/2018 |
| EP | 2908675 B1 | 1/2019 |
| EP | 3054798 B1 | 5/2019 |
| EP | 3316711 B1 | 5/2019 |
| ES | 1091555 U | 10/2013 |
| GB | 2468932 A | 9/2010 |
| GB | 2502053 A | 11/2013 |
| GB | 2502055 A | 11/2013 |
| GB | 2502162 A | 11/2013 |
| GB | 2502163 A | 11/2013 |
| GB | 2502164 A | 11/2013 |
| GB | 2507103 A | 4/2014 |
| GB | 2507104 A | 4/2014 |
| GB | 2514767 A | 12/2014 |
| GB | 2519101 A | 4/2015 |
| JP | H05212100 | 8/1993 |
| JP | H07506008 A | 7/1995 |
| JP | H08511966 A | 12/1996 |
| JP | 2001502542 A | 2/2001 |
| JP | 3392138 | 1/2003 |
| JP | 3696619 B2 | 9/2005 |
| JP | 2006-018057 | 1/2006 |
| JP | 2006507499 A | 3/2006 |
| JP | 2006-338178 | 12/2006 |
| JP | 3976345 B2 | 9/2007 |
| JP | 2009022752 A | 2/2009 |
| JP | 3159830 U | 6/2010 |
| JP | 2013545474 A | 12/2013 |
| JP | 2014504886 A | 2/2014 |
| JP | 2014534814 A | 12/2014 |
| JP | 2015512262 A | 4/2015 |
| KR | 100495099 B1 | 11/2005 |
| KR | 20110002227 U | 3/2011 |
| KR | 1020110132290 | 12/2011 |
| KR | 20120093046 A | 8/2012 |
| KR | 101256914 | 4/2013 |
| RU | 72821 U1 | 5/2008 |
| RU | 2336001 C2 | 10/2008 |
| RU | 2336002 C2 | 10/2008 |
| RU | 94815 U1 | 6/2010 |
| RU | 2425608 | 8/2011 |
| RU | 110608 U1 | 11/2011 |
| RU | 124120 | 1/2013 |
| RU | 2509516 C2 | 3/2014 |
| SE | 9900703 L | 12/1999 |
| TW | 200928407 A | 7/2009 |
| UA | 92474 C2 | 11/2010 |
| UA | 67598 U | 2/2012 |
| UA | 100068 C2 | 11/2012 |
| UA | 100734 C2 | 1/2013 |
| UA | 78167 | 3/2013 |
| UA | 102423 C2 | 7/2013 |
| WO | WO9118860 A1 | 12/1991 |
| WO | WO 9418860 | 9/1994 |
| WO | WO9418860 A1 | 9/1994 |
| WO | WO9501137 A1 | 1/1995 |
| WO | WO98017131 A1 | 4/1998 |
| WO | WO0064517 A1 | 11/2000 |
| WO | WO2013098397 | 12/2001 |
| WO | WO2012/109371 | 8/2002 |
| WO | WO2013060874 A2 | 5/2003 |
| WO | WO 2004/080216 A1 | 9/2004 |
| WO | WO 2004/095955 A1 | 11/2004 |
| WO | WO-2008139411 A2 | 11/2008 |
| WO | WO2008142015 A2 | 11/2008 |
| WO | WO2009045198 | 4/2009 |
| WO | WO2009063814 | 5/2009 |
| WO | WO2009118085 A1 | 10/2009 |
| WO | WO2009146484 | 12/2009 |
| WO | WO2010073122 | 7/2010 |
| WO | WO2010091593 A1 | 8/2010 |
| WO | WO2010118644 A1 | 10/2010 |
| WO | WO2010145805 A1 | 12/2010 |
| WO | WO2011079932 | 7/2011 |
| WO | WO2013060781 | 10/2011 |
| WO | WO-2011137453 A2 | 11/2011 |
| WO | WO2011147699 A1 | 12/2011 |
| WO | WO-2012027350 A2 | 3/2012 |
| WO | WO 2012/048266 | 4/2012 |
| WO | WO-2012072790 A1 | 6/2012 |
| WO | WO2012109371 A2 | 8/2012 |
| WO | WO2012117376 A1 | 9/2012 |
| WO | WO2012120487 | 9/2012 |
| WO | WO2013060784 A2 | 5/2013 |
| WO | WO2013098398 | 7/2013 |
| WO | WO2013116572 | 8/2013 |
| WO | WO2013138384 A2 | 9/2013 |
| WO | WO2013148810 A1 | 10/2013 |
| WO | WO2014004437 A1 | 1/2014 |
| WO | WO2014037794 A2 | 3/2014 |
| WO | WO2014054035 A1 | 4/2014 |
| WO | WO-2014060268 A1 | 4/2014 |
| WO | WO-2014060269 A1 | 4/2014 |
| WO | WO2015052513 | 4/2014 |
| WO | WO2015138589 A1 | 9/2015 |
| WO | WO2015192084 A1 | 12/2015 |
| WO | WO2016009202 | 1/2016 |
| WO | WO2016198266 | 12/2016 |
| WO | WO-2017001817 A1 | 1/2017 |

OTHER PUBLICATIONS

First Office Action for Chinese Application No. 201380054442.8 dated Aug. 30, 2016.
Notice to File a Response for Korean Application No. 10-2015-7010072 dated Oct. 19, 2016.
Japanese Notice of Allowance for Japanese Application No. 2015-512037 dated Dec. 12, 2015.
Decision to Grant for Russian Application No. 2014150496 dated Feb. 16, 2016.
Applicationand File History for U.S. Appl. No. 14/401,511, filed Nov. 14, 2014, Inventors: Lord.
Application and File History for U.S. Appl. No. 15/027,344, filed Apr. 5, 2016, Inventors: Lord et al.
Load Detecting Power Supply. National Semiconductor RD-166 Product Applications Design Center. Dec. 2008, 17 pages.
Sadaphal et al., "Random and Periodic Sleep Schedules for Target Detection in Sensor Networks," Tata Research Development and Design Centre and Department of Computer Science and Engineering—Indian Institute of Technology, Mar. 17, 2008.
International Preliminary Report on Patentability, for PCT/EP2013/059954, dated Jul. 10, 2014.
Written Opinion, for PCT/EP2013/059954, dated Apr. 16, 2014, 5 pages.
International Search Report, for PCT/EP2013/059954, dated Sep. 25, 2013, 8 pages.
Korean Office Action, Application No. KR 10-2014-7035205, dated Aug. 1, 2016, 6 pages.
Chinese Office Action, Application No. CN 201380025370.4, dated Mar. 21, 2016, 9 pages.
International Search Report, for PCT/EP2013/071070, dated Apr. 2, 2014, 6 pages.
International Search Report, for PCT/EP2013/071070, dated Nov. 21, 2014, 5 pages.
Search Report and Written Opinion for PCT/GB2014/053027, dated Apr. 22, 2015, 13 pages.
International Preliminary Report on Patentability, for PCT/GB2014/053027, dated Dec. 10, 2015, 19 pages.
Japanese Office Action, Application No. 2017-153826, dated Jun. 19, 2018, 3 pages ( 6 pages with translation).
Korean Office Action, Application No. 20157010072, dated Apr. 27, 2018, 10 pages (19 pages with translation).

(56) References Cited

OTHER PUBLICATIONS

Russian Search Report, Application No. 2016147728/12, dated Mar. 27, 2018, 3 pages (6 pages with translation).
Russian Decision to Grant, Application No. 2015114351/12, dated Aug. 24, 2016, 12 pages.
Chinese Office Action, Application No. 201480055728.2, dated Nov. 17, 2017, 8 pages (20 pages with translation).
Japanese Search Report, Application No. 2016-520611, dated Mar. 28, 2017, 18 pages (46 pages with translation).
Japanese Office Action, Application No. 2016-520611, dated May 9, 2017, 6 pages (11 pages with translation).
Korean Office Action, Application No. 10-2016-7009422, dated Jul. 26, 2017, 8 pages (17 pages with translation).
Australian Third Extended Report, Application No. 2014333571, dated May 23, 2017, 4 pages.
Application and File History for U.S. Appl. No. 14/401,511, filed Nov. 14, 2014, Inventor: Christopher Lord.
Application and File History for U.S. Appl. No. 14/432,752, filed Mar. 31, 2015, Inventor: Christopher Lord.
Australian First Examination Report, Application No. 2013261801, dated Jul. 10, 2015, 2 pages.
Australian First Extended Report, Application No. 2013331849, dated Dec. 1, 2015, 3 pages.
Australian First Extended Report, Application No. 2014333571, dated Nov. 25, 2016, 4 pages.
Australian Second Examination Report, Application No. 2013261801, dated Jun. 23, 2016, 3 pages.
Australian Second Extended Report, Application No. 2013331849, dated May 2, 2016, 3 pages.
Australian Second Extended Report, Application No. 2014333571, dated Jan. 23, 2017, 4 pages.
Canadian Office Action, Application No. 2,872,764, dated Aug. 31, 2016, 6 pages.
Canadian Office Action, Application No. 2,872,764, dated Oct. 5, 2015, 6 pages.
Canadian Office Action, Application No. 2,886,922, dated Mar. 4, 2016, 3 pages.
Canadian Office Action, Application No. 2,922,280, dated Jan. 20, 2017, 4 pages.
Chinese Office Action, Application No. 201380025370.4, dated Oct. 11, 2016, 3 pages (8 pages with translation).
Chinese Office Action, Application No. 201380054442.8, dated Jun. 28, 2017, 8 pages.
Corrected IPRP, International Application No. PCT/EP2013/071070, dated Jun. 19, 2015, 13 pages.
EP Office Action, Application No. 13779773, dated Aug. 7, 2017, 2 pages.
European Extended Report, Application No. 13779773.4, dated Jun. 20, 2016, 2 pages.
Japanese Decision to Grant, Application No. 2015-537196, dated Jul. 6, 2017, 3 pages (6 pages with translation).
Japanese Office Action, Application No. 2015-537196, dated Mar. 22, 2016, 3 pages (7 pages with translation).
Japanese Office Action, Application No. 2015-537196, dated Nov. 22, 2016, 4 pages (9 pages with translation).
Japanese Search Report, Application No. 2016-520611, Search completed Mar. 28, 2017, 18 pages (35 pages with translation).
Korean Office Action, Application No. 10-2014-7035201, dated Sep. 23, 2016, 6 pages.
New Zealand Extended Report, Application No. 71778, dated Aug. 15, 2016, 3 pages.
New Zealand First Examination Report, Application No. 717778, dated May 2, 2016, 4 pages.
New Zealand Extended Report, Application No. 717778, dated Nov. 16, 2016, 1 page.
PCT International Preliminary Report on Patentability for PCT/GB2014/053027, dated Dec. 10, 2015, 19 pages.
Application and File History for U.S. Appl. No. 15/027,344, filed Apr. 5, 2016, Inventor: Lord.

Great Britain Search Report, Application No. GB1511566.0, dated Nov. 30, 2015, 4 pages.
International Preliminary Report on Patentability, Application No. PCT/GB2016/051729, dated Sep. 20, 2017, 11 pages.
International Search Report and Written Opinion, Application No. PCT/GB2016/051729, dated Aug. 22, 2016, 20 pages.
Application and File History for U.S. Appl. No. 15/739,019, filed Dec. 21, 2017, Inventor: Dickens.
Japanese Office Action, Application No. 2018-033546, dated Feb. 15, 2019, 7 pages (12 pages with translation).
Canadian Office Action, Application No. 2,997,062, dated Mar. 4, 2019, 6 pages.
Russian Decision to Grant, Application No. 2018129541, dated Feb. 28, 2019, 14 pages.
European Examination Report, Application No. 18207065.6, dated Feb. 3, 2020, 5 pages.
Ortman, Terry, *Pro Vari Menu Tour*, YouTube, Mar. 9, 2011, as available at https://www.youtube.com/watch?v=1PKQOgQ42z8, as retrieved on Feb. 18, 2020, 17 pages (with machine-generated transcript).
Japanese Office Action, Application No. 2018-033546, dated Oct. 24, 2019, 14 pages.
Korean Office Action, Application No. 10-2018-7038106, dated Oct. 17, 2019, 17 pages.
EPO Communication re: Letter from the Opponent, Application No. 16729349.7, dated Feb. 12, 2020, 53 pages.
Dictionary definition for 'Tap', Cambridge dictionary online, accessed Jan. 27, 2020.
EP Notice of Opposition (Philip Morris Products), Application No. 14784354.4, dated Feb. 20, 2020, 69 pages.
EP Notice of Opposition (JT International), Application No. 14784354.4, dated Feb. 20, 2020, 43 pages.
Transactions of the Royal Society of Edinburgh, 1848, vol. XVIII, containing the Makerstoun Magnetical and Meteorological Observations for 1844, Robert Grant & Sons, pp. 419-424.
Farsalinos, Konstantinos et al., "Evaluation of Electronic Cigarette Use (Vaping) Topography and Estimation of Liquid Consumption: Implications for Research Protocol Standards Definition and for Public Health Authorities' Regulation" Int J Environ. Res. Public Health, 2013.
Williams, Monique et al., "Variability Among Electronic Cigarettes in the Pressure Drop, Airflow Rate, and Aerosol Production" Nicotine & Tobacco Research Advance Access, Oct. 12, 2011.
Chinese Office Action, Application No. 201680038584.9, dated Sep. 29, 2019, 17 pages.
EPO Communication of Notice of Opposition, EP Application No. 13779773.4, dated Oct. 8, 2019, 7 pages.
ProVari Owner's Manual published by ProVape Copyright marking: 2010; available on web.archive.org (Dec. 16, 2010).
You Tube video "ProVari Menu Tour" published on Mar. 10, 2011.
YouTube "Vlog" "Tips & Tutorial for Using Your ProVape Electronic Cigarette" by Phil Busardo published on Jun. 30, 2012.
Screen capture of ProVari V2 information page on. the ProVape website as it appeared on May 8, 2012 via a query on web.archive.org.
YouTube video "A PBusardo Review—The Provari V2—Provape" published on Feb. 28, 2012.
Application and File History for U.S. Appl. No. 15/231,359, filed Aug. 8, 2016, Inventor: Christopher Lord, 572 pages.
Decision to Grant dated Oct. 30, 2018 for Russia Application No. 2017145807, 13 pages.
Extended European Search Report for Application No. 18207065, dated Apr. 12, 2019, 8 pages.
Extended European Search Report for Application No. 19164915.1, dated Jul. 8, 2019, 8 pages.
Farsalinos, Konstantinos et al., "Evaluation of Electronic Cigarette Use (Vaping) Topography and Estimation of Liquid Consumption: Implications for Research Protocol Standards Definition and for Public Health Authorities Regulation" Int J Environ. Res. Public Health, 2013, 15 pages.
Japanese Office Action, Application No. 2018-033546, dated Oct. 29, 2019, 14 pages.

(56) References Cited

OTHER PUBLICATIONS

Office Action dated Aug. 11, 2020 for Japanese Application No. 2019112583, 6 pages.
Office Action dated Jun. 17, 2020 for Russian Application No. RU201603517, 10 pages.
Office Action dated Apr. 27, 2018 for Korean Application No. 2018-028946712, 19 pages.
Office Action dated Dec. 28, 2018 for Korean Application No. 10-2018-7014831, 8 pages (15 pages with translation).
Vaishali et al., "Random and Periodic Sleep Schedules for Target Detection in Sensor Networks", Journal of Computer Science and Technology, May 2008, vol. 23(3) pp. 343-354.
Williams, Monique et al., "Variability Among Electronic Cigarettes in the Pressure Drop, Airflow Rate, and Aerosol Production" Nicotine & Tobacco Research Advance Access, Oct. 12, 2011, 8 pages.
Search Report for Chinese Application No. 2019103229551, dated Mar. 13, 2021, 3 pages.

\* cited by examiner

ELECTRONIC INHALATION DEVICE WITH SUSPENSION FUNCTION

RELATED APPLICATION

This application is a division of application Ser. No. 14/432,752 filed Mar. 31, 2015, which is a National Stage of International Application No. PCT/EP2013/071070, filed Oct. 9, 2013, which in turn claims priority to and benefit of United Kingdom Patent Application No. GB1218817.3, filed Oct. 19, 2012, each of which is hereby fully incorporated herein by reference.

TECHNICAL FIELD

This specification relates to electronic inhalation devices such as electronic smoking devices, including electronic cigarettes.

BACKGROUND

Electronic inhalation devices such as electronic smoking devices, including electronic or e-cigarettes, may be cigarette-sized and function by allowing a user to inhale a nicotine vapor from a liquid store by applying a suction force to a mouthpiece. Some electronic inhalation devices have a pressure sensor that activates when a user applies the suction force and causes a heater coil to heat up and vaporize the liquid

SUMMARY

An electronic inhalation device comprising a power cell and a computer, where the computer comprises a computer processor, a memory and an input-output means; wherein the computer is configured in use to enter a menu mode when a user activates the menu mode.

By activating a menu mode, the user is able to interface with the electronic inhalation device and configure it accordingly. This is an advantage for the user who can customize certain settings according to their use preferences.

Suitably, the electronic inhalation device is an electronic cigarette.

Suitably, the computer is a microprocessor.

Suitably, the menu mode enables a user to select a menu option from two or more menu options.

Suitably, the menu mode enables a user to alter an operational parameter of the device.

Having two or more options gives the user a greater degree of freedom for configuration and alteration of operation parameters.

Suitably, the computer comprises a normal mode that allows a user to use the device for its primary function and inhale using the inhalation device. Suitably, the computer is configured in use to change from normal mode to menu mode when a user activates the menu mode. Suitably, in menu mode the normal mode function of inhalation is suspended.

In normal mode, the user is able to use the electronic inhalation device for its primary purpose which is to inhale substances used in nicotine replacement therapy. Suspending this normal mode when a user enters the menu mode provides enhanced safety for the user and the ability to use the device for a function other that inhaling substances, namely operating the menu to change operational parameters.

Suitably, the menu mode is activated by a user interacting with the device. Suitably, a menu option is selected by a user interacting with the device.

Suitably, the device comprises an input device connected to the computer and the menu mode is activated through the input device. Suitably, the device comprises an input device connected to the computer and a menu option is selected through the input device.

Suitably, the input device comprises a switch. Suitably, the input device comprises a button.

By providing an input device connected to the computer, a user is able to easily access the computer menu system.

Suitably, the input device comprises a pressure sensor. Suitably, the computer is configured in use to enter the menu mode when the pressure sensor detects operation of the device outside of normal mode use.

Suitably, the computer is configured to enter the menu mode when the pressure sensor detects blowing into the device. Suitably, the computer is configured to enter the menu mode when the pressure sensor detects sucking on the device.

Suitably, the computer is configured to enter the menu mode when the pressure sensor detects a short burst of blowing into the device. Suitably, the computer is configured to enter the menu mode when the pressure sensor detects a short burst of sucking on the device.

Suitably, the computer is configured to enter the menu mode when the pressure sensor detects two or more short bursts of blowing into the device. Suitably, the computer is configured to enter the menu mode when the pressure sensor detects two or more short bursts of sucking on the device.

A pressure sensor may in normal mode be used to identify when a user is inhaling on the device so as to activate the vaporizer to vaporize a liquid for inhalation. Using the same pressure sensor as an input device therefore reduces the number of components needed for a device and provides the user with a means to enter a menu mode and control menu option selection.

Suitably, the device further comprises a vaporizer having a heating element. Suitably, the vaporizer is prevented from activating when the device is in menu mode.

It is advantageous to disable the vaporizer in menu mode since this provides greater safety for the user. Also, when the pressure sensor is used as an input device for the menu mode, this prevents unintended activation of the vaporizer.

Suitably, in menu mode, a selected menu option changes an electrical current delivered to the heating element. Suitably, in menu mode, a selected menu option changes an electrical current profile delivered to the heating element.

Suitably, in menu mode, when the device comprises a pressure sensor, a selected menu option changes a threshold pressure value at which the heating element is activated.

Suitably, in menu mode, a selected menu option changes a power delivered to the heating element.

Suitably, in menu mode, a selected menu option changes a vaporization parameter.

Suitably, in menu mode, a selected menu option changes a heating element activation time.

Suitably, in menu mode, a selected menu option enables a vapor boost which provides increased power to the heating element at the start of an inhalation.

Suitably, the heating element is a heating coil.

Suitably, in menu mode, a selected menu option enables calibration of the device. Suitably, in menu mode, a selected menu option enables a parameter to be adjusted to calibrate the device. Suitably, calibration comprises adjusting the current supplied to the heating element. Suitably, calibration comprises adjusting the vaporization effect of the coil.

Suitably, the device further comprises a liquid in a liquid store and the calibration comprises adjusting the amount of liquid that is vaporized by the heating element.

Advantageously, the menu mode allows the control and modification of parameters that affect the technical operation of the device. This enables a user to change variables that affect vaporization thereby providing an enhanced and customized product for the user.

Suitably, in menu mode, a selected menu option enables the device to be reset.

Since settings can be changed by the user, it is advantageous to supply a means to reset the device to factory settings.

Suitably, the device further comprises use data relating to a user's use of the device, and the use data is stored in the computer memory. Suitably, in menu mode, a selected menu option clears the use data from the computer memory. Suitably, in menu mode, a selected menu option activates the transmission of the use data.

Another advantage of the menu mode is that it enables control of functions outside the normal use of the electronic inhalation device. This gives the device further technical function and provides a more useful device for the user. Providing a more useful device may lead to better adherence to usage.

Suitably, the device further comprises an audio signaling means. Suitably, in menu mode, data relating to a user's use of the device is transmitted using the audio signaling means.

Suitably, the device is configured to notify a user by a sound signal when the device enters the menu mode. Suitably, the device is configured to notify a user by a sound signal when the device leaves the menu mode. Suitably, the device is configured to notify a user by a sound signal as the user navigates through menu options. Suitably, the device is configured to notify a user by a sound signal when a menu option is selected.

Using sound to notify the user of menu operations has the advantage that a number of different sound signals can easily be used that a user is able to distinguish between. Thus a user can easily identify where they are in the menu system without having to look at the device. This is especially an advantage when the device is controlled using a pressure sensor since the device will be in a user's mouth and a user will find it difficult to look at it. However, when the device is in the mouth, it will be near the user's ears so the sound will be easily heard.

Suitably, the device is configured to leave menu mode after a predetermined time of device inactivity.

Suitably, in menu mode, a selected menu option causes the device to leave the menu mode.

Suitably, the device comprises a control unit comprising the power cell and the computer, and the control unit is releasably-attachable to a vaporizer unit, wherein the device is configured to leave the menu mode when the vaporizer is disconnected from the control unit.

As used herein the term electronic smoking device includes not only an electronic cigarette but also electronic smoking articles other than an electronic cigarette, for example a heat-not-burn (HNB) device or an electrically powered spray device in which a pressurized liquid is stored in a canister and released under the control of an electronic valve in response to a pressure drop produced by the user drawing on the device. These devices are referred to herein collectively as "electronic smoking devices", which term is intended to cover any electronic device which can be used as a substitute for a cigarette or as a cessation device, which does not involve the conventional combustion of tobacco.

BRIEF DESCRIPTION OF THE DRAWINGS

Embodiments will now be described, by way of example only, with reference to the accompanying drawings in which.

DETAILED DESCRIPTION

Figure 1:
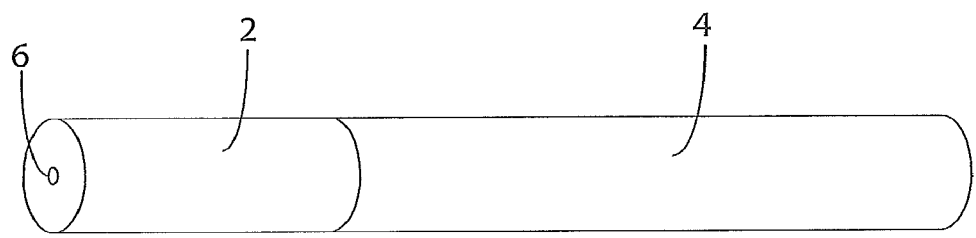
FIG. 1 is a side perspective view of an electronic inhalation device.
Figure 2:
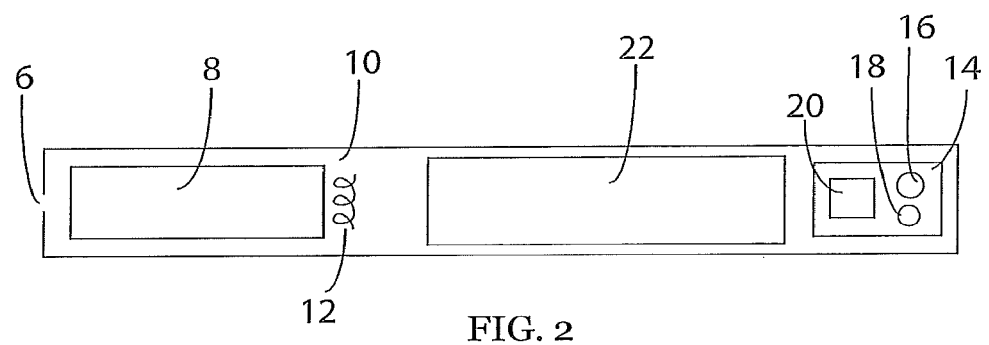
FIG. 2 is a side sectional view through the device of FIG. 1.

Referring to FIG. 1 and FIG. 2 there is shown an electronic inhalation device in the form of a cigarette-shaped electronic cigarette. The electronic cigarette has a mouthpiece 2 and a cigarette body 4. The mouthpiece 2 has an air outlet 6 at a first end and is connected to the cigarette body 4 at a second end.

Inside the electronic cigarette there is a liquid store 8 towards the mouthpiece end and a vaporizer 10 having a heating coil 12. The vaporizer 10 is arranged next to the liquid store 8 to allow liquid to be transferred onto the vaporizer 10 for vaporizing. A circuit board 14 contains a pressure sensor 16, an audio signaling means 18 such as a buzzer or a speaker, and a computer 20. A power cell 22 provides power to the device.

The general operation of the electronic cigarette is similar to that of known devices. When a user takes a draw on the electronic cigarette, a suction force is applied to the mouthpiece 2 and the air outlet 6. A reduced pressure inside the electronic cigarette causes the power cell 22 to provide power to the vaporizer 10 which in turn vaporizes the nicotine liquid solution. The resultant vapor is then inhaled by the user.

In this example the operation of the electronic cigarette goes beyond that of a general device. In a normal operating mode, when a user applies a suction force to the electronic cigarette, the resultant airflow causes a drop in pressure from ambient pressure to a lower pressure, within the device. The pressure sensor 16 provides a signal to the computer 20. The computer 20 runs software that monitors the pressure signal from the pressure sensor 16 and when it determines that the pressure has been reduced below a threshold pressure, the computer 20 provides an electrical current to the heating coil 12 in order to heat the heating coil 12 and vaporize liquid from the liquid store 8.

The software running on the computer 20 controls the operation of the device. The computer 20 allows a user to enter a menu mode. When a user has finished using the device and wishes to enter a menu mode they can activate the menu mode by carrying out an action on the device that is different to how they use it in a normal mode. In a normal mode, a user typically inhales on the device for 2 to 3 seconds, replicating the action of smoking a real cigarette. In this situation the computer 20 receives a signal from the pressure sensor 16 and activates the vaporizer 10, heating up the heating coil 12.

To enter a menu mode, a user can blow briefly into the device. The pressure sensor 16 sends a signal to the computer 20, and the computer recognizes that this is not normal operation but a signal to enter a menu mode. Alternatively a user can blow briefly into the device, suck suddenly on the device in a quick burst or indeed blow or suck two or more times in rapid succession. In each of these circumstances, the pressure sensor 16 will send a signal to the computer 20 and the computer 20 will determine that this is not normal operation but a signal for the device to enter a menu mode.

When the device enters the menu mode the user is notified by a sound being played by the audio signaling means 18. In addition, the normal operation of vaporization is suspended. In this way, whilst the user is in menu mode, the user can suck or Now on the device without activating the vaporizer 10 and heating coil 12.

After entering a menu mode, the user is able to control the menu and navigate through the menu options using the pressure sensor for control. For example, slight blowing on the device could move forward through the menu options, and slight sucking could move backwards through the menu options. By having a sensitive control of the menu options, the user would not interfere with the liquid transfer process of the liquid out of the liquid store 8 and onto the vaporizer 10.

As a user progresses through the menu options, the user is notified by sound signals and is able to differentiate between the menu options by the different sound signals. For example a first menu option could sound a single beep, a second menu options could sound a double beep and so on.

When a user wishes to select a menu option then again they can do this by sucking or blowing into the device. For instance, if slight pressure change is used to control the navigation through the menu as described, a more forceful pressure change from a more forceful sucking or blowing can select a menu option.

In this way, the user is able to have complete control of the menu options including navigating through the different menu options and selecting a given menu option.

The menu options are selectable to change the technical configuration of the electronic inhalation device. One of the menu options is selectable to configure the vaporization properties. A user can select this option and set the vaporization lower or higher. The computer 20 would then act to modify the current sent to the heating coil 12 to change the vaporization properties during normal use.

Another menu option is to provide a boost such that at the start of the vaporization during normal use, a higher current is delivered providing a peak in the temperature and an initial boost to vaporization.

Another menu option acts to calibrate the device. If the device is required to have a fixed amount of liquid vaporization per unit time, then the control of vaporization could be used to achieve this.

Another menu option acts to change the device country settings. Different countries may have different tastes and requirements for vaporization and vapor delivery so enabling the user to select their host country would provide a simple means for them to achieve this. This enables a single product to be sold across multiple territories.

Another menu option acts to change the threshold pressure at which the device is activated during normal operation. This enables the threshold pressure to be increased or decreased. Changing of the threshold pressure could also be a result of the country selection by the user because a given location may be at a particular altitude and this affects the ambient pressure, which may have an impact on the threshold pressure.

Another menu option acts to modify the heating element activation time. In normal mode, a user inhaling on the device activates the heating coil to vaporize liquid. In an example use, the vaporizer may be activated for a predetermined time once activated and this time may be modified using the menu system.

Another menu option acts to modify other time parameters such as the time an electronic inhalation device is deactivated following a coil overheat scenario or the time until a device is deactivated following lack of use of the device.

Another menu option acts to reset the device such that the variables and parameters modified by the user are reset back to factory conditions.

The computer 20 comprises a memory means and use data corresponding to the user's use of the device can be stored in the memory means. Another menu option acts to initiate transmission of this data. Once activated the data may be transmitted using modulated sound and received by a device configured to interpret this modulated sound signal. A related menu option acts to wipe the data from the memory, thereby clearing the memory.

Another menu option acts to leave the menu mode, returning the device to a normal mode. A user is notified by a sound signal that the menu mode has been exited and a normal mode has been entered into.

In addition, whilst in menu mode, if the computer 20 determines that the device is inactive for a given threshold inactive time, the device leaves menu mode and may enter either a normal mode or a sleep mode, the sleep mode being a lower power mode.

Figure 3:
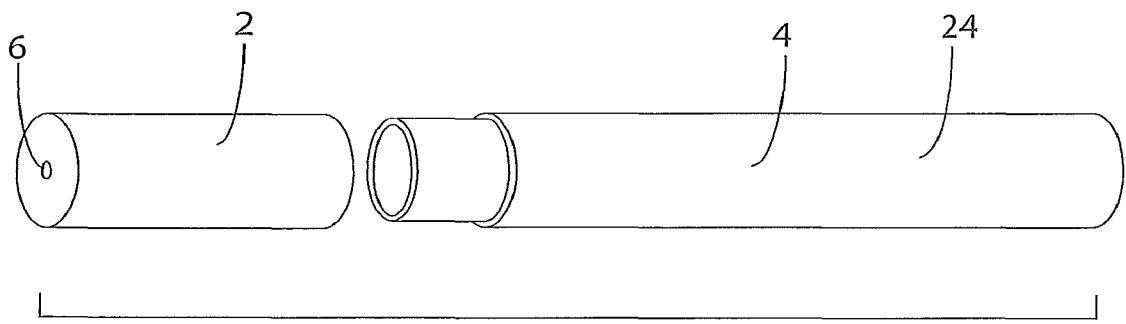
FIG. 3 is an exploded side perspective view of an electronic inhalation device having separated mouthpiece and control unit.
Figure 4:
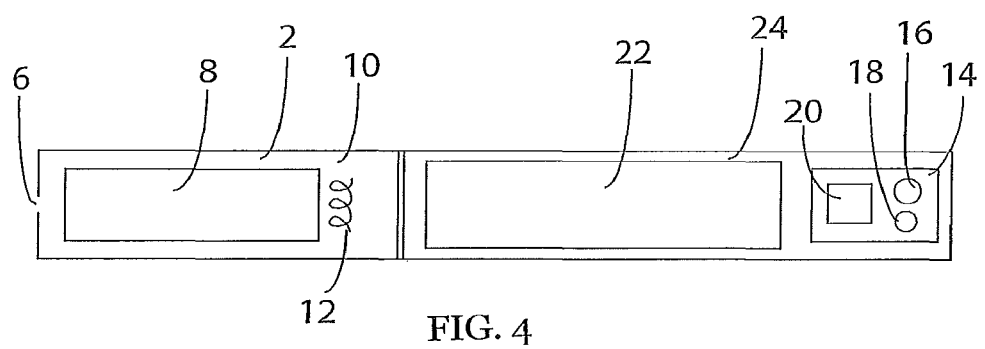
FIG. 4 is a side sectional view through the device of FIG. 3 with connected mouthpiece and control unit.

FIG. 3 and FIG. 4 show a device similar to that shown in relation to FIG. 1 and FIG. 2. The difference is that the mouthpiece 2 is releasably-attachable to the cigarette body 4. The mouthpiece comprises a female screw thread connection means, the cigarette body 4 is a control unit 24 having a male screw thread connection means. The mouthpiece 2 and the control unit 24 can be screwed together or taken apart.

In this example, the mouthpiece 2 comprises the liquid store 8 and the vaporizer 10 with heating coil 12. The control unit 24 comprises the power cell 22 and circuit board 14 with pressure sensor 16, audio signaling means 18 and computer 20. The screw thread connection provides an electrical connection such that when the mouthpiece 2 and control unit 24 are screwed together, electrical current can be delivered to the heating coil 12 upon activation of the vaporizer 10.

In this example, the device can only enter a menu mode when the parts are assembled since the user can only operate the device when it is assembled. Whilst in menu mode, if the user disconnects the mouthpiece, the device leaves menu mode and the user is notified by a sound signal.

Figure 5:
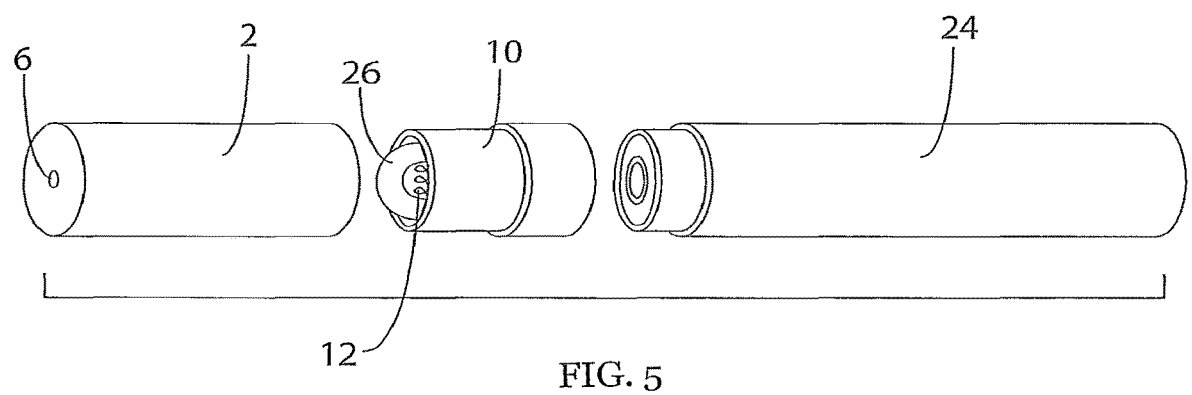
FIG. 5 is an exploded side perspective view of an electronic inhalation device having separated mouthpiece, vaporizer and control unit.
Figure 6:
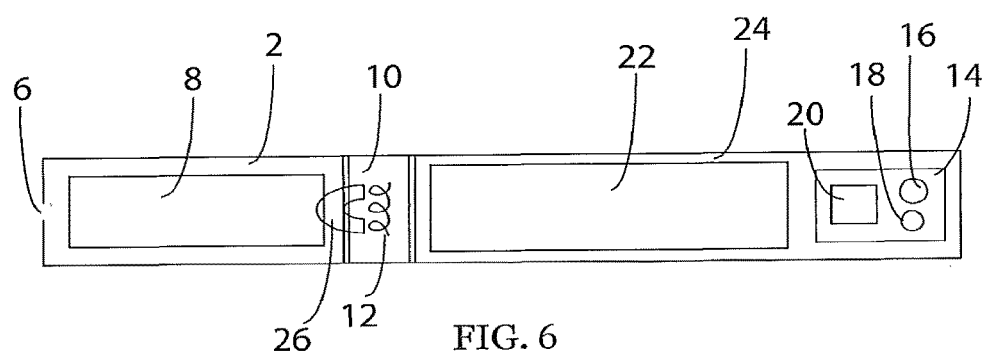
FIG. 6 is a side sectional view through the device of FIG. 5 with connected mouthpiece, vaporizer and control unit.

FIG. 5 and FIG. 6 show a device similar to that shown in relation to FIG. 3 and FIG. 4. However in this example, the vaporizer 10 is removable from the mouthpiece 2. The mouthpiece 2 has a cylindrical opening that forms a interference push-fit with the vaporizer 10. As such the mouthpiece 2 can be separated from the vaporizer 10. The mouthpiece 2 comprises the liquid store 8. The vaporizer 10 comprises the heating coil 12 and a wick 26. The wick 26 protrudes from the end of the vaporizer 10 such that when the mouthpiece 2 and the vaporizer 10 are connected, the wick 26 dips into the liquid store 8.

In use, as a user inhales on the device, liquid is transferred from the liquid store 8 and onto the wick 26 before being transferred onto the heating coil 12 for vaporization.

Figure 7:
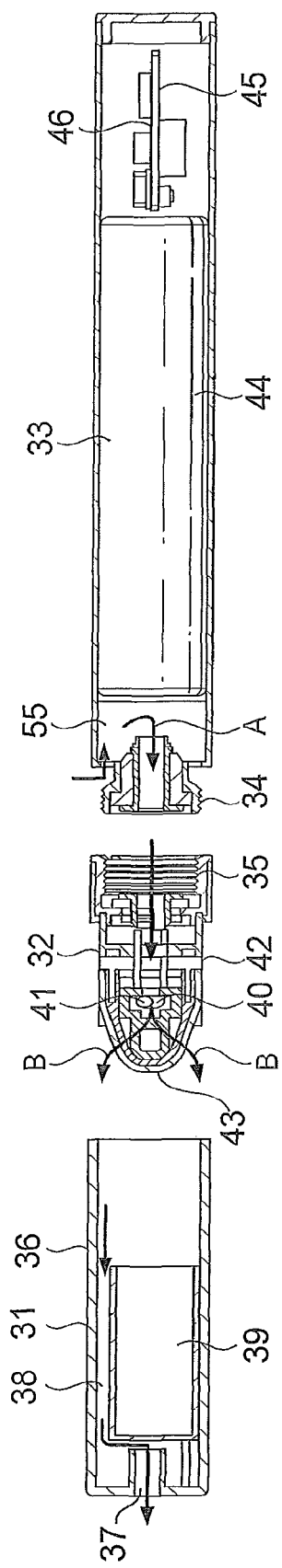
FIG. 7 is an exploded longitudinal sectional view of another embodiment of an electronic inhalation device similar to that of FIGS. 3 and 4, and that of FIGS. 5 and 6, showing the internal components thereof in greater detail.
Figure 8:
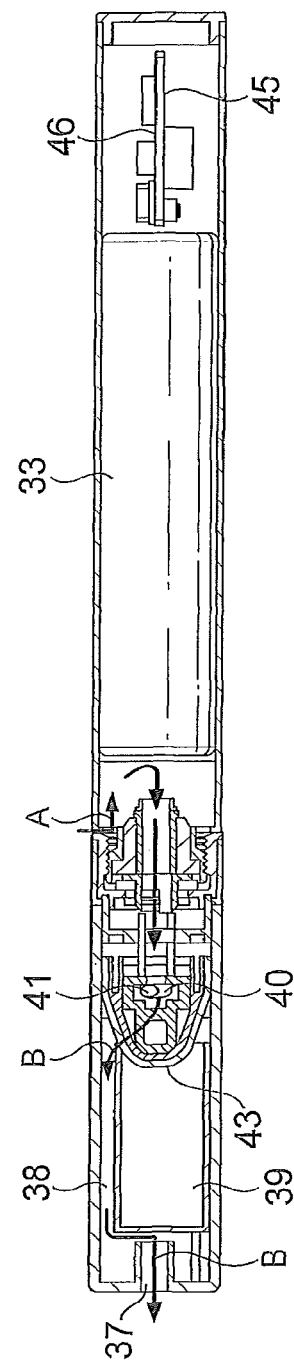
FIG. 8 is a sectional view of the electronic inhalation device of FIG. 7 when assembled.

FIGS. 7 and 8 illustrate another embodiment of an electronic inhalation device in the form of an electronic cigarette. The device is similar to the embodiment shown in FIGS. 3 and 4, and the embodiment shown in FIGS. 5 and 6, although the embodiment in FIGS. 7 and 8 shows the internal components thereof in greater detail. The device comprises a mouthpiece 31, vaporizer device 32 and control unit 33 which can be assembled as shown in FIG. 8 to provide a generally cylindrical device that can be used as a substitute for a conventional tobacco burning cigarette. The control unit 33 is provided with a threaded extension 34 that is received in an interior thread 35 in the vapor device 32. The mouthpiece 31 comprises a generally cylindrical plastics casing 36 that can be push-fitted on to the vapor device 32.

The mouthpiece 31 has an outlet 37 to supply vapor to the mouth of the user and an outlet passageway 38 for the vapor which, in use is produced by the vapor device 32. The mouthpiece 31 also includes a liquid reservoir comprising a porous storage matrix 39 such as plastics open foam material impregnated with a vaporizable liquid, such as a nicotine containing liquid that in use is vaporized by the vapor device 32. The matrix 39 acts as a reservoir for the liquid and since the mouthpiece 31 is readily removable and replaceable, it can be used as a refill capsule when the liquid in the porous matrix 39 becomes depleted and needs to be replenished.

The vapor device 32 includes an electronic heating coil 40 that is wound around a ceramic core 41, supported on a ceramic base 42. A generally U-shaped wicking member 43 is configured to wick liquid from the reservoir 39 towards the heating element 40 by capillary action. The wicking member 43 may for example by made of a metallic foam such as nickel foam.

The heater coil 40 is powered by a rechargeable battery 44 located in the control unit 33 through electrical contacts 48, 49 (not shown in FIGS. 7 and 8, see FIG. 9) which electrically couple the heater coil to the battery 44 when the control unit 33 is fitted to the vapor device 32 by the engagement of threads 34, 35. The electrical power of the battery 44 is supplied to the heater coil 40 under the control of a control circuit 45 mounted on circuit board 46 within the control unit 33.

Figure 9:
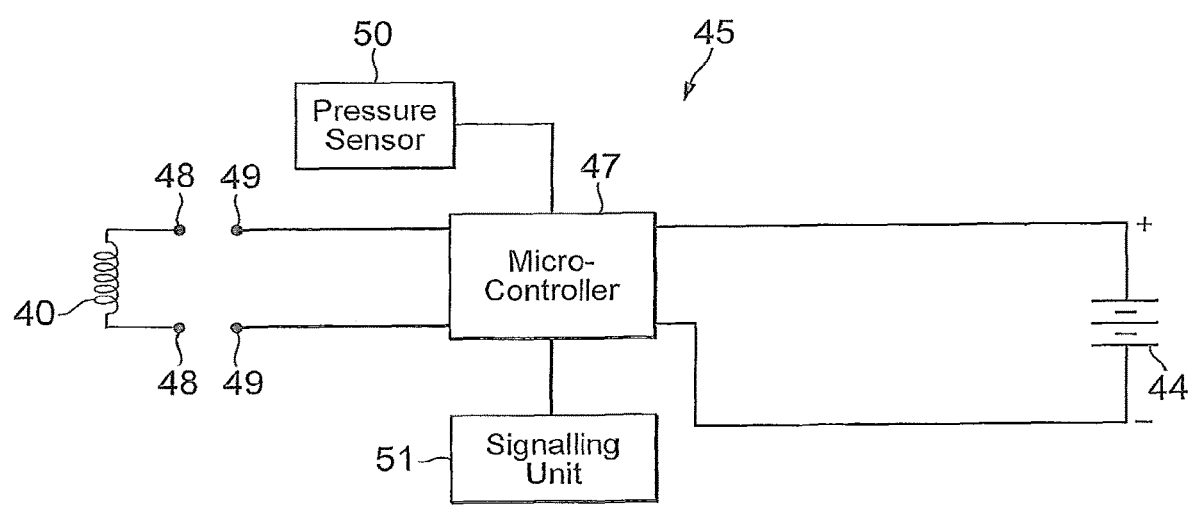
FIG. 9 is a schematic circuit diagram of the electronic inhalation device of FIGS. 7 and 8.

As shown in FIG. 9, the control circuit 45 includes a microcontroller 47 powered by battery 44 to supply an electric heating current to the coil 40 through the contacts 48, 49 that are brought into electrical connection when the control unit 33 is threadedly engaged with the vapor device 32 by means of threads 34, 35 shown in FIG. 7.

A pressure sensor 50 detects when a user draws on the mouthpiece 38, as described in more detail hereinafter.

Also, a signaling unit 51 is provided to provide audio or visual outputs to the user indicative of operational conditions of the device. For example, the signaling device may include a light emitting diode that glows red when the user draws on the device. The signaling device may provide predetermined audio or visual signals to indicate for example that the battery 44 needs to be recharged.

The supply of current from the battery 44 to the mouth controller is controlled by switching transistor 52.

When the user draws on the mouthpiece 1 so as to draw vapor through the outlet 37, the pressure sensor 50 detects the drop in pressure which is communicated from within the vapor device 32 through the interior of the control unit 33 to the circuit board 45. Microcontroller 47 responds to the pressure drop detected by the sensor 50 to supply electrical current to the heater coil 40, which vaporizes liquid supplied by capillary action through the U-shaped wicking member 43. An air inlet passageway 55 is provided in the joint between the vapor unit 32 and control unit 33 so that air can be drawn through the threaded extension 34 of the control unit 33 into the vapor device 32 in the direction of arrows A, so that the resulting vapor is drawn in the direction of arrows B through passageway 38 to the outlet 37.

The operation of the device of FIGS. 7 and 8 may be the same as that of the devices of FIGS. 1 to 6 described previously and so a detailed description of such operation will not be repeated here. However, it is intended that the control circuit 46 of the embodiment of FIGS. 7 and 8 may be configured as per the circuit board 14 of the embodiments of FIGS. 1 to 6, and vice versa. Specifically, the circuit board 46 may comprise a separate audio signaling means 18. Alternatively, the signaling unit 51 may act as the audio signaling means described in the previous embodiments. Also, the pressure sensor 50 may be disposed on the circuit board 46 within the control unit 33 and the vapor device 32 may be in fluid communication with the area within the control unit 33, via an open passageway for example (not shown), such that a drop in pressure within the vapor device 32 is detectable by a pressure sensor on the circuit board 46 within control unit 33. Also, the microcontroller 47 of the embodiment of FIGS. 7 and 8 may be programmed as per the computer 20 of the embodiment of FIGS. 1 to 6 to monitor the measured pressure from the pressure sensor 16 to control the device accordingly and as described previously, particularly to run software to control the various menu modes as described previously.

Although examples have been shown and described, it will be appreciated by those skilled in the art that various changes and modifications might be made without departing from the scope of the claims. The computer processor could be a microprocessor or a microcontroller. The device is not restricted to being cigarette shaped. The computer processor, audio signaling means and pressure sensor are not restricted to being on the same circuit board. The heating coil used for vaporization could be replaced by another type of non-coil heating element. The control for the menu could be a button or a switch or some other means, rather than the pressure sensor In order to address various issues and advance the art, the entirety of this disclosure shows by way of illustration various embodiments in which the claimed invention(s) may be practiced and provide for superior electronic inhalation devices. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future. Any feature of any embodiment can be used independently of, or in combination with, any other feature.

The invention claimed is:

1. An electronic inhalation device comprising:
a vaporizer having a heating element, and a device body comprising a power cell for providing power to the vaporizer, and a computer, wherein the computer comprises a computer processor, a memory and an input-output means;
wherein the computer is configured in use to enter a menu mode when a user activates the menu mode; and
wherein in the menu mode, a selected menu option enables a vapor boost which provides increased power to the heating element at a start of an inhalation or a selected menu option changes an operational parameter of the device to change at least one of:
a threshold pressure value at which the heating element is activated, or
a heating element activation time which is a predetermined time the heating element is activated for once the heating element is activated regardless of any further input from a user,
wherein the computer comprises a normal mode that allows a user to use the inhalation device for a primary function and inhale using the inhalation device, and wherein the computer is configured to monitor for a user input when in the normal mode and, in response to the user input, supply an electrical current to the heating element.

2. The electronic inhalation device of claim 1, wherein in the menu mode, a selected menu option enables calibration of the device.

3. The electronic inhalation device of claim 2, wherein in the menu mode, a selected menu option enables a parameter to be adjusted to calibrate the device.

4. The electronic inhalation device of claim 2, wherein calibration comprises one or more of the following:
adjusting a current supplied to the heating element;
adjusting a vaporization effect of the coil;
adjusting an amount of liquid from a liquid store that is vaporized by the heating element.

5. The electronic inhalation device of claim 1, wherein the electronic inhalation device is an electronic cigarette, and the heating element is a heating coil.

6. The electronic inhalation device of claim 1, wherein the computer is a microprocessor.

7. The electronic inhalation device of claim 1, wherein the menu mode enables a user to select a menu option from two or more menu options.

8. The electronic inhalation device of claim 1, wherein the computer is configured in use to change from the normal mode to the menu mode when a user activates the menu mode.

9. The electronic inhalation device of claim 1, wherein the device comprises an input device connected to the computer and the menu mode is activated through the input device.

10. The electronic inhalation device of claim 9, wherein the input device comprises a switch, a button or a pressure sensor.

11. The electronic inhalation device of claim 10, wherein the input device is a pressure sensor, and computer is configured to enter the menu mode when the pressure sensor detects at least one short burst of sucking or blowing on the device.

12. The electronic inhalation device of claim 1, wherein in the menu mode, a selected menu option enables the device to be reset.

13. The electronic inhalation device of claim 1, wherein the device further comprises use data relating to a user's use of the device, and the use data is stored in the computer memory.

14. The electronic inhalation device of claim 13, wherein in the menu mode, a selected menu option clears the use data from the computer memory.

15. The electronic inhalation device of claim 14, wherein in the menu mode, a selected menu option activates transmission of the use data.

16. The electronic inhalation device of claim 1, wherein the device further comprises an audio signaling means, and the device is configured to notify a user by a sound signal when the device enters or leaves the menu mode.

17. The electronic inhalation device of claim 16, wherein the device is configured to notify a user by a sound signal as the user navigates through menu options or when a menu option is selected.

18. The electronic inhalation device of claim 1, wherein the device is configured to leave the menu mode after a predetermined time of device inactivity.

19. The electronic inhalation device of claim 1, wherein in the menu mode, a selected menu option causes the device to leave the menu mode.

20. The electronic inhalation device of claim 1, wherein the device comprises a control unit comprising the power cell and the computer, the control unit being releasably-attachable to the vaporizer, and wherein the device is configured to leave the menu mode when the vaporizer is disconnected from the control unit.

21. The electronic inhalation device of claim 1, wherein in the menu mode, a selected menu option enables a user to modify the time until the electronic inhalation device is deactivated following lack of use of the electronic inhalation device.

22. An electronic inhalation device comprising:
a vaporizer having a heating element, and a device body comprising a power cell for providing power to the vaporizer, and a computer, wherein the computer comprises a computer processor, a memory and an input-output means;
wherein the computer is configured in use to enter a menu mode when a user activates the menu mode; and
wherein in the menu mode, a selected menu option changes an operational parameter of the device to change at least one of:
an electrical current profile delivered to the heating element,
a threshold pressure value at which the heating element is activated, or
a heating element activation time which is a predetermined time the heating element is activated for once the heating element is activated,
wherein the computer comprises a normal mode that allows a user to use the inhalation device for a primary function and inhale using the inhalation device, and wherein the computer is configured to monitor for a user input when in the normal mode and, in response to the user input, supply an electrical current to the heating element, and wherein the vaporizer is prevented from activating when the device is in the menu mode.

* * * * *